United States Patent [19]

Dillard et al.

[11] Patent Number: 4,814,866
[45] Date of Patent: Mar. 21, 1989

[54] SCHLIEREN COLOR TELEVISION IMAGE APERTURING DEVICE

[75] Inventors: Homer E. Dillard, Bridgeton; John A. VanHoogstrate, St. Peters, both of Mo.; Ronald J. Muffler, Sandy, Utah

[73] Assignee: McDonnell Douglas Corporation, St. Louis, Mo.

[21] Appl. No.: 21,420

[22] Filed: Mar. 4, 1987

[51] Int. Cl.$^4$ .............................................. H04N 9/31
[52] U.S. Cl. ...................................... 358/60; 358/62
[58] Field of Search .................................. 358/60–64, 358/56

[56] References Cited

U.S. PATENT DOCUMENTS

| | | | |
|---|---|---|---|
| 2,295,443 | 9/1942 | Wilson | 358/60 X |
| 2,552,464 | 5/1951 | Siezen | 358/60 X |
| 2,600,590 | 6/1952 | Thomas | 358/56 X |
| 2,642,487 | 6/1953 | Schroeder | 358/60 X |
| 2,837,676 | 6/1958 | Michlin | 358/60 X |
| 2,840,632 | 6/1958 | Parker | 358/60 |
| 3,130,263 | 4/1964 | Manning | 358/64 |
| 3,141,106 | 7/1964 | Kapany | 313/92 |
| 3,446,916 | 5/1969 | Abel et al. | |
| 3,469,026 | 9/1969 | Winik et al. | |
| 3,538,249 | 11/1970 | Graser, Jr. et al. | |
| 3,592,529 | 7/1971 | Juhlin et al. | 358/62 X |
| 3,601,470 | 8/1971 | Juhlin | 358/62 X |
| 3,627,909 | 12/1971 | Liu et al. | |
| 3,730,992 | 5/1973 | True | |
| 3,746,911 | 7/1973 | Nathanson et al. | 358/231 X |
| 3,806,636 | 4/1974 | True et al. | |
| 3,864,730 | 2/1975 | Roth | 358/60 X |
| 3,946,154 | 3/1976 | Roussin | |
| 4,150,396 | 4/1979 | Haveng et al. | 358/60 |
| 4,152,724 | 5/1979 | Hunter | 358/109 |
| 4,283,120 | 8/1981 | Orser et al. | 350/361 |
| 4,295,159 | 10/1981 | Carollo et al. | 358/22 |
| 4,305,099 | 12/1981 | True et al. | 358/231 |
| 4,404,588 | 9/1983 | Fanizza et al. | 358/231 X |
| 4,423,438 | 12/1983 | Nakamura | 358/60 X |
| 4,496,969 | 1/1985 | True et al. | 358/62 |
| 4,498,101 | 2/1985 | True et al. | 358/62 |
| 4,533,216 | 8/1985 | Orser et al. | 358/62 X |
| 4,730,211 | 3/1988 | Hasegawa | 358/60 |
| 4,737,840 | 4/1988 | Morishita | 358/60 X |

FOREIGN PATENT DOCUMENTS 1076571  7/1967  United Kingdom .

OTHER PUBLICATIONS

"Space Redistribution of Optical Image with Light Conducting Fiber for Color TV Pickup Tube", by Ward F. Davidson, Jr., RCA TN No. 136
"Mural Television Display Using Fiber Optics", by Frederick H. Nicoll, RCA TN No. 188.
Applied Optics, vol. 16, No. 12, Dec. 1977, pp. 3082–3084.

Primary Examiner—James J. Groody
Assistant Examiner—E. A. Faris
Attorney, Agent, or Firm—Rogers, Howell, Moore & Haferkamp

[57] ABSTRACT

A Schlieren-type color television projector utilizes a fiber optic rear projection screen (FORPUS) at an initial focal point to translate the spatially separated, converging rays of component colors produced by the Schlieren-type color television projector into a plurality of spatially combined, diverging rays of combined colors which are then suitable for further processing by a conventional optical lens system which can either aperture or vignette the image without color fringing, separation, or a shift in the color balance normally experienced when aperturing or vignetting a Schlieren-type color television image.

9 Claims, 3 Drawing Sheets

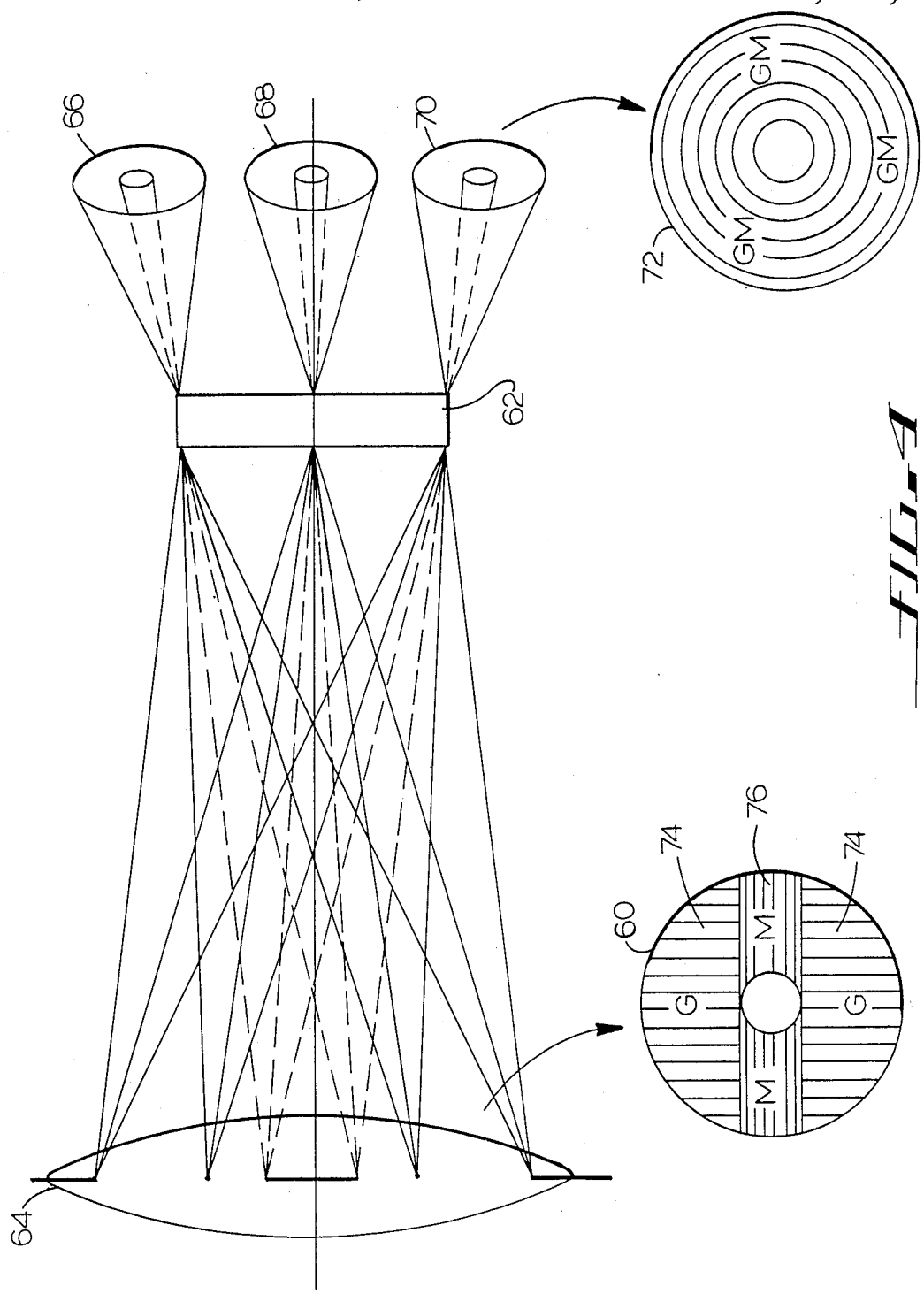

SCHLIEREN COLOR TELEVISION IMAGE APERTURING DEVICE

BACKGROUND AND SUMMARY OF THE INVENTION

The Schlieren-type color television projector, commonly referred to as a light valve projector, was first developed over ten years ago and has been used extensively for large screen visual displays in many applications, including flight simulators. The light valve essentially utilizes a color filter plate/lens assembly to spatially separate the green/magenta colors from the light produced by a projection lamp. An electron beam deformable control surface generates difraction patterns for color modulation. A Schlieren optical imaging system produces an output comprised of a plurality of spatially separated, converging rays of component colors. With this projection system, significant advantages are obtained including improved resolution, definition, and brightness thereby permitting larger screen color television imaging than was previously possible with other television systems.

As a result of this Schlieren projection lens, the cross section of the light body (bundle) emanating from the lens contains spatially separated green/magenta color areas that converge and combine correctly to form an image at the focal point of the lens. Attempts to modify the image through the use of optical devices coupled to the Schlieren lens have met with very limited success in that the image degrades rapidly unless all of the output light body is utilized in the projected image. However, with an optical system, such as a zoom lens, or aperture device utilizing an iris, a portion of the output is either masked or vignetted such that it will not be transmitted through the optical array. When all of the light body is not transmitted, color balance deteriorates rapidly, or undesirable color fringing, or even complete degradation of the final projected image occurs. This limitation of the Schlieren light valve dramatically reduces its utility in such applications as a flight simulator as the projected image in a simulator must be capable of quick and accurate changes in magnification, focus, and image brightness which is typically achieved through a conventional optical device which would degrade the Schlieren image. Furthermore, previous Schlieren light valves did not utilize conventional zoom lenses or other such optical devices because of their variable aperturing of the light body.

To solve the problems of the prior art which limited the applicability and usefulness of the Schlieren light valve in those applications such as a flight simulator, the inventors herein have developed a technique for translating the output of the Schlieren light valve into a light body which can be passed through conventional optical devices such as zoom lenses and the like which utilize aperture control and which do not degrade the final projected image. This technique consists essentially of focusing an image made visible by the Schlieren optical system onto an intermediate surface, such as a fiber optic rear projection screen (FORPS), which collects and redistributes the color information emanating from the light valve from the spatially separate converging rays of green/magenta colors into an image plane comprised of spatially combined diverging rays of combined colors. The fiber optic rear projection screen (FORPS) can be made of virtually any fiber optic material of any thickness or length, with any numerical aperture, have ground or polished surfaces, and even contain impurities, kinks, bias cuts or tapers. The inventors herein have tested FORPS having thickness of 0.06 inches to 0.2 inches and they have successfully translated the Schlieren light body. The thicker FORPS have a tendency to increase the mixing of the light body and thus be less susceptible to degradation of the image as it is passed through conventional optics while thinner FORPS have the advantage of transmitting more light and are thus more efficient.

In a preferred embodiment of a projector as utilized in a flight simulator, a decollimating lens is inserted in front of the light valve along its optical axis to focus the light at an intermediate plane. At the focal point, a rigid FORPS containing a plurality of fibers arranged in coherent fashion and parallel to the optical axis is located and the image appears thereon. Due to the nature of the FORPS, the image is transmitted through the FORPS and out the back surface. The image transmitted through the surface and emanating therefrom is used as the source for a projection lens which further processes the image, as desired. This conventional optical projection lens can be apertured by an iris, or controlled by vignetting when a zoom-type projection lens is used, without undesirable spectral affects at the final projected image as would otherwise be experienced with the Schlieren light valve output.

The foregoing has been a brief description of the principal advantages and features of the present invention. A more thorough understanding thereof may be attained by referring to the drawings and description of the preferred embodiment which follows.

BRIEF DESCRIPTION OF THE DRAWINGS

FIG. 3 is a diagrammatic view of a television projection system of the present invention coupled to conventional optics as would be used in a color target projector of a flight simulator; and FIG. 4 is a schematic which details the image elements from the light valve and as translated by the FORPS.

DETAILED DESCRIPTION OF THE PREFERRED EMBODIMENT

Figure 1:
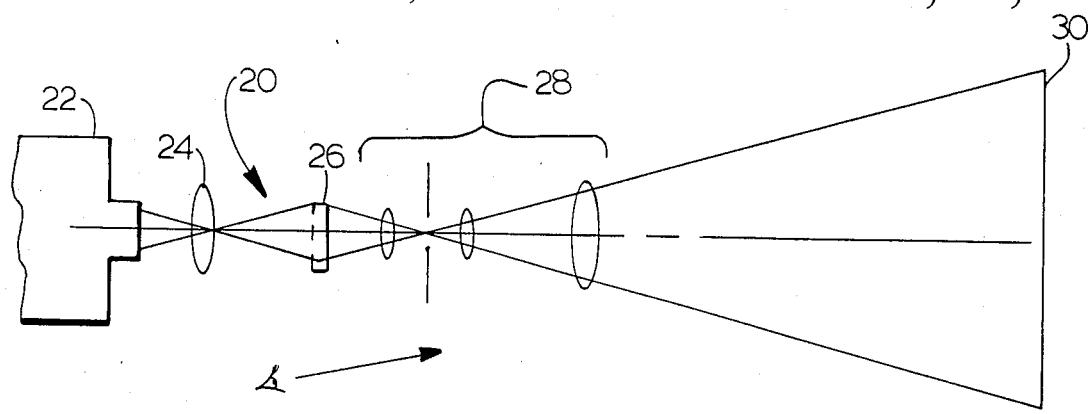
FIG. 1 is a diagrammatic view of the color television system including the fiber optic rear projection screen (FORPS) of the present invention.
Figure 2:
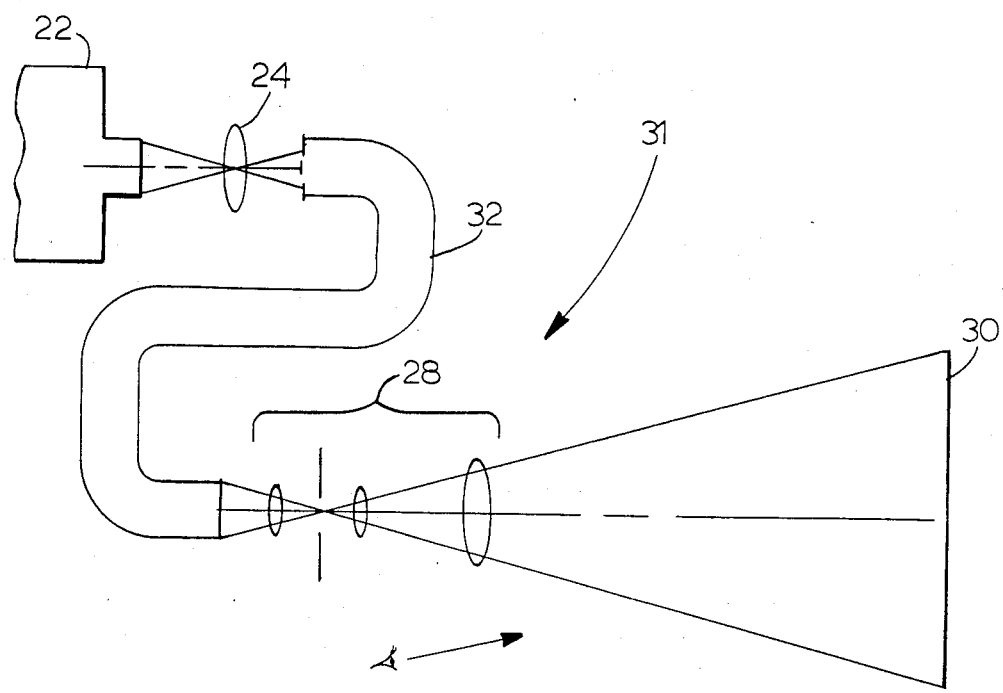
FIG. 2 is a second embodiment of the invention which utilizes a flexible fiber optic bundle as the image translation means.
Figure 2:
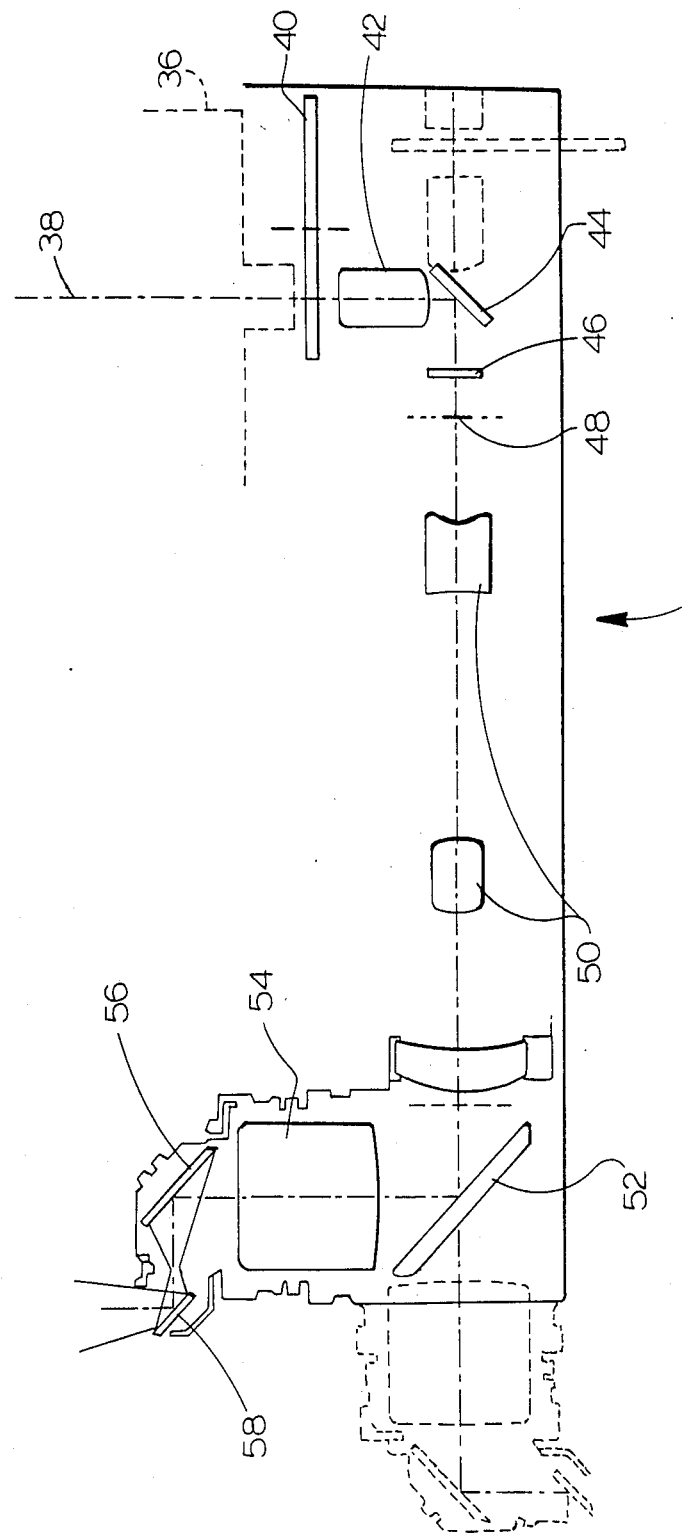

The inventors' preferred embodiment 20 is shown in FIG. 1 and includes a light valve 22 which projects an image which is focused by a decollimating lens 24 onto a fiber optic rear projection screen (FORPS) 26 which translates the components of the image produced by the light valve 22 making it suitable for further processing by a variable focal length lens 28 and projection onto a simulator screen 30. In still another embodiment 31, as best shown in FIG. 2, a flexible coherent fiber optic bundle 32 is substituted for the FORPS 26 of the preferred embodiment 20. This fiber optic bundle 32 achieves the same effect and is not limited to a particular dimension or orientation. In fact, as shown in FIG. 2, the flexible fiber optic bundle 32 may be bent or curved as desired to suit any particular application. The flexing or bending of the bundle 32 not only does not interfere with proper operation, but actually enhances the operation of the invention in that a more thorough mixing of the spatially separated color components of the incident image are more fully combined before exiting the bundle 32.

As best shown in FIG. 3, the present invention is particularly suited for use as a color target projector 34. The color target projector 34 is generally comprised of a light valve projector 36 which produces an image along an optical axis 38. The image is processed by a variable density filter wheel 40 to control the brightness of the image, focused by a decollimating lens 42, reflected from an optional folding mirror 44 through an image edge fader diak 46 onto the FORPS 48. As explained below in connection with FIG. 4, the FORPS 48 translates the light valve image from a plurality of spatially separated, converging rays of component colors into a plurality of spatially combined diverging rays of combined colors which is transmitted to the zoom lens 50. The zoom lens 50 is a typical, conventional optical lens system which can vignette the image, but as a result of the FORPS 48, will not seriously detract from the quality thereof. A second optical folding mirror 52 then directs the translated image through an objective lens 54 onto a yaw mirror 56, and pitch mirror 58; each of said objective lens 54, yaw mirror 56 and pitch mirror 58 being adjustable to further adjust the projected image onto the simulator dome (not shown). With the color target projector 34 as shown in FIG. 3, the Schlieren light valve 36 can be used to project an image which can be conveniently controlled in a manner as required for the rapid simulation of flight in connection with a flight simulator.

A more detailed explanation of the operation of the present invention can best be understood by referring to FIG. 4. As is well known in the art, the image produced by a light valve is comprised of a plurality of rays each of which has a spatially separated color specific arrangement of green and magenta as shown in the crossed hatch circle designated 60. These rays are projected onto the FORPS 62 by the lens system 64 of the Schlieren light valve. Each resolution pixel at the intermediate image plane where the FORPS 62 is located represents an object point formed by the light valve lens system 64. A ray contained within the light cone that contributes to form this image will, after entering an optical fiber in the FORPS 62, retain the same angle throughout its passage therethrough. However, these rays will gradually disperse due to small skew components and to the minor imperfections of the individual fibers of the FORPS 62 and the large number of reflections as it traverses the fibers so as to fill an annulus of a cone when emerging at an angle equal to the incident angle. This revised color distribution is depicted graphically in cones 66, 68, and 70. As seen from the optical axis, each cone has a color distribution as shown in the circular disk labeled 72. If a convergent cone is obliquely incident on the fiber, the emergent light will be in the form of a hollow cone with a half width essentially equal to the angle of convergence of the incident cone. This characteristic will be exhibited at the FORPS 62 rear image surface when formed by light from the light valve lens system 64. It is noted that the central area of the light valve lens system 64 is obscured due to mechanical/physical constraints, although this obscured area is of no concern and does not impact upon the present invention. The separate green area 74 and the separate magenta area 76 of the image rays 60 are combined by the FORPS 62 into a donut-shaped annulus represented as 72 having a mixed color composition labeled GM. Aperturing or vignetting of the light cone from each resolution pixel exiting the FORPS 62 will cause the desired reduction in final projection image brightness without fringing, separation, or a shift in the color balance of the image.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a television projection system having means to produce an image comprised of a plurality of spatially separated, converging rays of component colors, and means to focus said rays along an optical axis at a focal point, said image being thereby unsuited to aperture control, the improvement comprising means to translate said image rays into a plurality of spatially combined, diverging rays of combined colors suitable for aperture control, said translation means including a rear projection screen comprised of a plurality of fiber optic fiber elements arranged in coherent fashion and aligned parallel to the optical axis and at the focal point thereof.

2. The device of claim 1 wherein said fiber optic rear projection screen (FORPS) is approximately 0.06 inches thick and has a numerical aperture of approximately 0.35.

3. The device of claim 2 wherein both sides of the FORPS are polished and further comprising an anti-reflective coating applied to both sides.

4. The device of claim 1 wherein the television projection system utilizes a Schlieren light valve.

5. The device of claim 4 further comprising a plurality of optical elements aligned along the optical axis to further process said translated image for projection.

6. In a television projection system utilizing a Schlieren light valve having means to produce an image, said image thereby being comprised of a plurality of rays each having a specific color distribution, said rays being focused along an optical axis to a focal point, the improvement comprising means to translate said image into a plurality of rays, each of said rays having a nonspecific color distribution so that said translated image may be further processed by aperturing techniques without significant degradation thereof, said translation means comprising a fiber optic rear projection screen (FORPS), said FORPS being aligned along the optical axis of the image and at the focal point thereof.

7. The device of claim 6 further comprising a lens means aligned along the optical axis of the projected image, said lens means having means to focus the projected image on the FORPS.

8. The device of claim 6 wherein said fiber optic rear projection screen (FORPS) is approximately 0.06 inches thick and has a numerical aperture of approximately 0.35.

9. The device of claim 6 wherein said translation means comprises a bundle of fiber optic elements, an end of said bundle being positioned at the focal point of the image source.

* * * * *